United States Patent Office 3,006,908
Patented Oct. 31, 1961

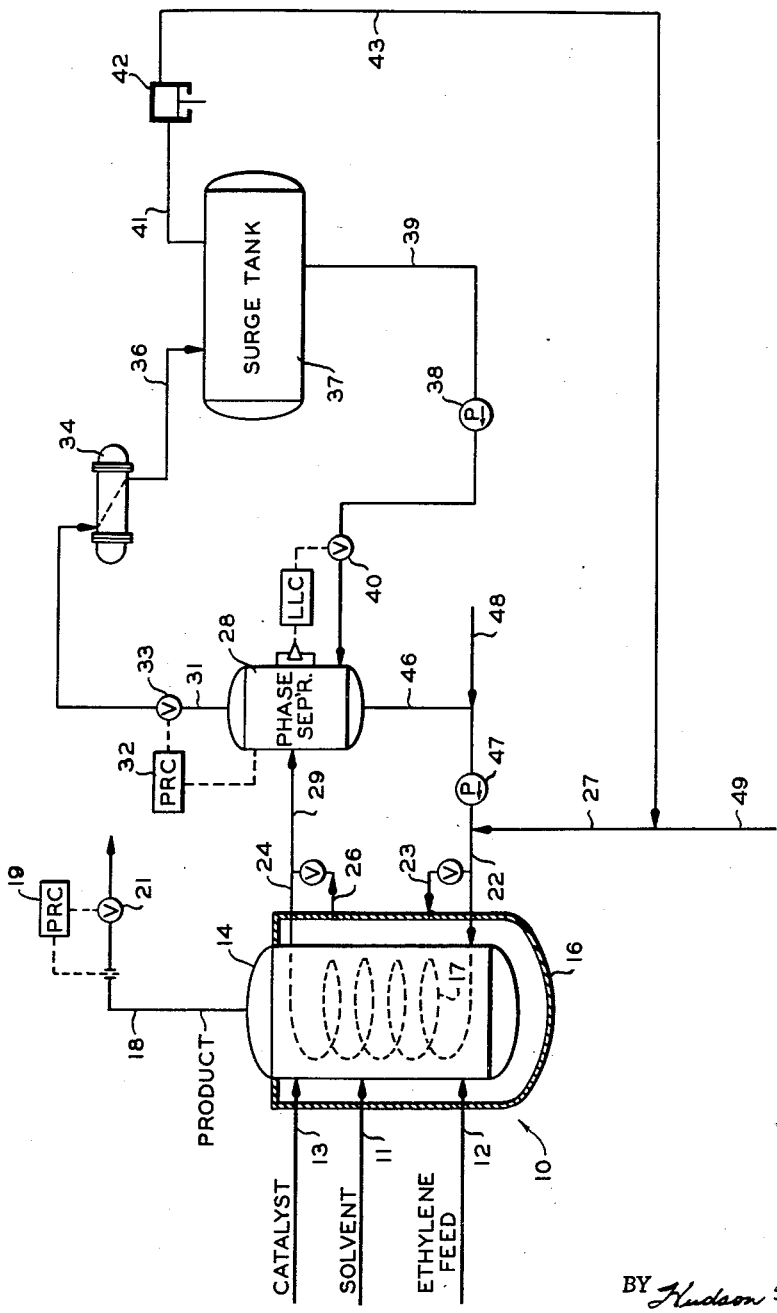

3,006,908
HEAT TRANSFER IN EXOTHERMIC REACTIONS
Robert F. Dye, Bartlesville, Okla., assignor to Phillips Petroleum Company, a corporation of Delaware
Filed Apr. 8, 1957, Ser. No. 651,444
13 Claims. (Cl. 260—94.9)

This invention relates to exothermic reactions. In one aspect, it relates to a method for improving the rate of heat transfer in polymerization processes. In another aspect, it relates to an improved heat transfer system for use with polymerization reactors.

Various methods are described in the literature for producing normally solid and semisolid polymers. For example, hydrocarbons, such as ethylene, propylene, isobutene, butadiene, and styrene, can be polymerized, either independently or in various admixtures with one another, to produce solid and semisolid polymers. Recently, considerable attention has been directed toward the production of solid olefin polymers, such as polymers of ethylene and/or propylene. The polymerizations are frequently carried out in the presence of a solid catalyst, utilizing a liquid solvent as the reaction medium. The polymerization reactions are exothermic so that it becomes necessary to provide for the removal of heat liberated by the reaction. The removal of the heat of reaction is frequently accomplished by employing a reactor system provided with an indirect heat exchange means through which a suitable coolant is circulated. In accordance with this invention, an improved and efficient method is provided for removing the heat of reaction from exothermic reactions, particularly polymerization reactions.

It is an object of this invention to provide an improved method for transferring heat from the reaction mixture in a reaction zone to a coolant being circulated in indirect heat exchange therewith.

Another object of the invention is to provide an improved heat transfer system for use with polymerization reactors.

A further object of the invention is to provide a method for transferring heat by indirect heat exchange wherein substantially all of the heat is transferred as latent heat of vaporization.

Other and further objects and advantages of the invention will become apparent to one skilled in the art upon consideration of the accompanying disclosure and drawing which is a flow diagram illustrating a preferred embodiment of the invention.

As previously mentioned, an indirect heat exchange mean is often utilized to remove the heat of reaction from polymerization processes. In a conventional method of operation, a liquid coolant is circulated through the heat exchange means which generally comprises a coil or coils positioned within the reaction vessel and/or a jacket which surrounds that vessel. In flowing through the coil and/or jacket, the coolant removes heat from the reaction zone in order to maintain the temperature therein at a desired level. It is generally desirable to have the coolant undergo partial vaporization since the boiling film coefficient is much higher than the ordinary sensible heat transfer film coefficient. Because of the pressure drop through the coil and/or jacket, the entering liquid coolant is generally subcooled with respect to the saturation pressure at that point. As a result, the coolant must be heated to its boiling point within the coil and jacket before it can vaporize. Thus, in that portion of the coil and jacket which is utilized to heat the coolant to its boiling point, heat is being transferred only as sensible heat. The remaining portion of the coil and jacket transfers heat as latent heat of vaporization, which is the more efficient method for accomplishing the heat transfer. I have now discovered a method of heat transfer whereby substantially all of the heat transferred from the reaction zone to the coolant can be transferred as latent heat of vaporization.

The instant invention resides in a method which makes possible the removal of the heat of reaction in polymerization processes as latent heat of vaporization and eliminates the necessity of heating the coolant to its boiling point before vaporization can occur. Broadly speaking, the method of this invention comprises adding a non-condensible gas to the coolant being passed in indirect heat exchange with the reaction mixture in a polymerization zone so as to lower the boiling point of the coolant and thereby cause vaporization to occur without the necessity of heating the coolant. The term "non-condensible gas" is used herein to define a material which is gaseous under the conditions of temperature and pressure in the heat exchange zone through which the coolant is circulated. In one embodiment, in a process which comprises charging a slurry of polymerization catalyst in a solvent and a polymerizable hydrocarbon to a reaction zone at a desired rate, and circulating a coolant through the reaction zone at a constant rate in indirect heat exchange with the reaction mixture therein so as to maintain a substantially constant reaction temperature, the invention resides in the improvement which comprises adding a non-condensible gas to the coolant prior to introduction thereof into the indirect heat exchange zone so as to lower the saturation temperature of the coolant, vaporizing the coolant and non-condensible gas substantially immediately upon introduction into the heat exchange zone, thereby removing heat from the reaction zone, and withdrawing liquid and vaporous coolant and non-condensible gas from the heat exchange zone. In a still more specific embodiment of the invention, the coolant and non-condensible gas after being condensed and compressed, as required, are recycled to the indirect heat exchange zone associated with the polymerization reaction zone.

The present invention is broadly applicable to polymerization processes in general, and more particularly to processes in which an olefin is contacted with a catalyst in suspension in a solvent. However, the invention is especially applicable for use in the production of polymers obtained according to the copending U.S. patent application of Hogan and Banks, Serial No. 476,306, filed December 20, 1954, now abandoned. As set forth in this application in more detail, unique polymers and copolymers can be produced by contacting one or more olefins with a catalyst comprising, as an essential ingredient, chromium oxide, preferably including a substantial amount of hexavalent chromium. The chromium oxide is ordinarily associated with at least one other oxide, particularly at least one oxide selected from the group consisting of silica, alumina, zirconia, and thoria. The amount of chromium, as chromium oxide, in the catalyst can range from 0.1 to 10 or more weight percent. Although chromium contents as high as 50 weight percent are operative, amounts above 10 weight percent appear to have little added advantage for the polymerization of ethylene. However, for the polymerization of propylene and higher boiling olefins, chromium contents as high as 25 or 30 percent are often advantageous. One satisfactory method for producing the catalyst comprises the use of a steam-aged commercial cracking catalyst comprising a coprecipitated gel containing approximately 90 weight percent silica and 10 weight percent alumina. Such a gel is impregnated with an aqueous solution of a chromium compound ignitable to chromium oxide. Examples of such compounds are chromium trioxide, chromium nitrate, chromium acetate, and ammonium chromate. The composite resulting from the impregnation step is dried and then contacted for a period of several hours at a temperature of from about 450 to 1500° F., preferably from about 900 to about 1000° F., for example, with a stream of a substantially anhydrous oxygen-containing gas, such as air. The olefin feed used for the polymerization is at least one olefin selected from the class of 1-olefins having a maximum of 8 carbon atoms per molecule and no branching nearer the double bond than the 4-position. Examples of such olefins are ethylene, propylene, 1-butene, 1-pentene, and 1,3-butaliene. Copolymers, such as ethylene-propylene copolymers and ethylene-butadiene copolymers, can be prepared by the described method. The polymerization can be effected at a temperature in the range of 150 to 450° F. The pressure can range from approximately atmospheric to as high as 1000 p.s.i.

A satisfactory method of conducting the polymerization as disclosed in the above cited patent application comprises contacting an olefin with a slurry of catalyst in a hydrocarbon solvent which can exist as a liquid at the temperature of polymerization. In such a case, the reaction pressure need only be sufficient to maintain the solvent substantially in the liquid phase, and will ordinarily range from about 100 to about 700 p.s.i. The instant invention is particularly applicable to this type of operation, i.e., one in which an olefin is contacted with a catalyst slurry. When utilizing the control method of this invention with this type of process, it has been found to be desirable to operate at a temperature such that the polymer is substantially all in solution in the hydrocarbon solvent. This temperature will vary according to the particular solvent which is utilized, e.g., with paraffins between about 250 and 450° F., and with naphthenes between about 230 and 450° F. However, it is to be understood that the method can be used with processes carried out at temperatures such that the polymer produced is in undissolved solid form.

Suitable solvents for use in the above described process are hydrocarbons which are liquid and chemically inert under the reaction conditions. Solvents which can be advantageously used include paraffins, such as those having from 3 to 12, preferably from 7 to 9, carbon atoms per molecule, for example, 2,2,4-trimethylpentane (isooctane), normal hexane, normal decane, isopentane, and the like. Another class of solvents which can be used are naphthenic hydrocarbons having from 5 to 6 carbon atoms in a naphthenic ring and which can be maintained in the liquid phase under the polymerization conditions. Examples of such naphthenic hydrocarbons are cyclohexane, cyclopentane, methylcyclopentane, methylcyclohexane, ethylcyclohexane, the methyl ethyl cyclopentanes, the methyl propyl cyclohexanes, and the ethyl propyl cyclohexanes. The described class of naphthenic hydrocarbons, includes condensed ring compounds such as decalin and the alkyl derivatives thereof. A preferred subclass of naphthenic hydrocarbons within the above defined general class is constituted by those naphthenic hydrocarbons having from 5 to 6 carbon atoms in a single ring and from 0 to 2 methyl groups as the only substituents on the ring. Thus, the preferred naphthenic hydrocarbon solvents are cyclopentane, cyclohexane, methylcyclopentane, methylcyclohexane, the dimethylcyclopentanes, and the dimethylcyclohexanes.

Referring now to the drawing, there is shown a flow diagram which illustrates diagrammatically a preferred embodiment of the invention. While the invention is described with relation to a particular polymerization process, it is to be understood that it is not intended to so limit the invention. Thus, the invention is, in general, applicable to any exothermic reaction in which it is desired to remove heat of reaction by circulating a coolant in indirect heat exchange with a reaction mixture. Examples of reactions other than polymerizations to which the invention is applicable include paraffin-olefin and aromatic-olefin alkylations and oxidation, chlorination, nitration, and sulfonation of hydrocarbons and other organic compounds. However, the invention is particularly applicable to a process in which a polymerizable hydrocarbon, such as an olefin, is contacted with a catalyst suspended in a solvent.

As shown in the drawing, a suitable solvent, such as cyclohexane, enters reactor 10 through inlet line 11. Inlet line 12 provides means for introducing a feed material, such as ethylene, into the system. A catalyst which preferably has a particle size in the range of about 40 to 100 mesh is charged to the reactor through line 13. The catalyst is generally added to the reactor in the form of a slurry in the solvent. The catalyst can be, for example, a chromium oxide-silica-alumina catalyst prepared by impregnating a 90 weight percent silica and 10 weight percent alumina gel composite with chromium trioxide, drying, and heating in air to obtain a catalyst composition containing approximately 2.5 weight percent chromium in the form of chromium oxide of which approximately half is in the form of hexavalent chromium.

Reactor 10 comprises a reaction vessel 14 surrounded by jacket 16 so as to provide a space therebetween through which coolant can be circulated. Disposed within reaction vessel 14 is a coil 17 of heat exchange tubes which in conjunction with the jacket surrounding the reaction vessel provide means for removing heat from the vessel during the polymerization. A suitable stirring means, not shown, is generally disposed in the reaction vessel to facilitate good contact between the reactant materials and to maintain the catalyst in suspension in the reaction mixture. The reaction vessel can be maintained, for example, at 257° F. and 500 p.s.i. with the reaction time ranging from about 15 minutes to about 10 hours. The reactor effluent, which is withdrawn through line 18, comprises a mixture of polymer, solvent, suspended catalyst, and small amounts of unreacted ethylene. A pressure recorder-controller 19, which is operatively connected to an orifice in line 18 and to a flow control means, such as motor valve 21, in the same line, provides means for maintaining a desired pressure in the reactor system.

The reaction mixture contained in reaction vessel 14 is maintained at the desired reaction temperature by circulating a coolant through heat exchange coil 17 and through the space between the reaction vessel and jacket 16. In general, any vaporizable liquid can be used as a coolant in the practice of the instant invention. However, it is preferred to utilize the same material which is employed as a solvent in the polymerization reaction. By using the same type of material, no separation problem subsequently arises because of leakage of coolant into the reaction vessel. The coolant is introduced into cooling coil 17 through line 22 and into the space between reaction vessel 14 and jacket 16 through line 23. Lines 24 and 26 are provided for the withdrawal of coolant from the cooling coil and the jacket, respectively. As will become apparent from the description hereinafter, the cooling system of the instant invention is a closed system in which the coolant removed from the heat exchange coil and jacket is thereafter returned to the heat exchange means.

As discussed hereinbefore, the coolant undergoes a pressure drop in flowing through the coil and/or jacket of the heat exchange means. In other words, the pressure of the coolant at the point of introduction into the heat exchange means is higher than at the point of withdrawal. Furthermore, since the coolant is boiling at the pressure at which it is withdrawn from the heat exchange means, it is seen that at the higher pressure of introduction the coolant is below its boiling point. Accordingly, in conventional systems it becomes necessary to heat the coolant to its boiling point at the pressure at which it is introduced into the heat exchange means. As a result, a portion of the coil and/or jacket is effective in transferring heat only as sensible heat rather than as latent heat of evaporation, the more efficient and more desirable method for transferring heat.

In accordance with the instant invention, a fluid more volatile than the coolant is added to the coolant by means of line 27 which is connected to line 22. Addition of a more volatile fluid to the subcooled coolant lowers the saturation temperature of the coolant, thereby causing vaporization to occur substantially immediately upon introduction of the mixture into the heat exchange means. In general, any fluid which is gaseous at the conditions of temperature and pressure in the heat exchange means can be employed as the more volatile fluid. For example, light hydrocarbons containing from 1 to 6, inclusive, carbon atoms per molecule, such as methane, ethane, ethylene, propane, propylene, and the like, can be employed. Furthermore, inert gases, such as nitrogen, and rare gases, such as helium and neon, can be utilized in the practice of the instant invention. However, it is generally desirable to use a gas which dissolves in the liquid coolant so that it is preferred to employ a light hydrocarbon. It is also preferred to use the same material which is utilized as the feed material in the polymerization reaction because any leakage of the material into the reaction vessel will not then result in a separation problem. In general, the amount of the more volatile fluid, such as ethylene, which is added to the coolant is that amount which is sufficient to cause the liquid coolant to boil at the inlet pressure and temperature of the heat exchange means. It is generally desirable to inject up to the maximum amount which is soluble at the inlet pressure and temperature. This amount can be readily determined by one skilled in the art and will, of course, depend upon the particular coolant employed as well as the inlet pressure and temperature. It is to be understood that it is within the contemplation of the invention to add lesser amounts of the more volatile fluid; however, in such a case vaporization does not occur in the heat exchange means as soon as it does when the maximum amount soluble in the coolant is added.

The coolant stream recovered from coil 17 and jacket 16 through lines 24 and 26, respectively, comprises liquid coolant, coolant vapors, and the non-condensible gas. Thereafter, the recovered coolant stream is passed into phase separation vessel 28 by means of line 29. The liquid coolant collects in the bottom of the phase separator while the coolant vapors and the non-condensible gas are taken overhead through line 31. Pressure recorder-controller 32, operatively connected to a flow control means, such as motor valve 33, in line 31 and to phase separator 28 provides means for maintaining a desired pressure in the cooling system. Furthermore, controller 32 by maintaining a desired back pressure on coil 17 and jacket 16 operates to determine the amount of vaporization which occurs in the heat exchange means as well as the temperature in the cooling system. Generally between about 10 and 40 weight percent of the coolant is vaporized in the heat exchange means. However, the amount to be vaporized in any polymerization reaction depends upon the amount of heat it is desired to remove from the reaction. It is to be understood that an indirect heat exchange means can be provided in line 22 in order to provide means for heating the coolant so as to compensate for any heat losses occurring as a result of circulating the coolant through the various lines of the cooling system.

The coolant vapors and non-condensible gas, which are removed from the phase separator through line 31, are then introduced into condenser 34. Liquid coolant and the non-condensible gas recovered from condenser 34 are passed by means of line 36 into coolant surge tank 37. It is to be understood that an equilibrium amount of the non-condensible gas remains dissolved in the liquid coolant in the phase separator and surge tank. The coolant, which is pumped from the surge tank by means of pump 38, is passed by means of line 39 into phase separator 28 wherein it is mixed with the liquid coolant therein. Phase separator 28 is provided with a liquid level controller which is operatively connected to a flow control means, such as motor valve 40, in line 39. The liquid level controller operates to adjust valve 40 so that the amount of liquid coolant pumped from surge tank 37 into the phase separator is that required to maintain a desired level therein. It is seen that as reaction conditions vary in the reaction vessel, the amount of coolant vaporized in the heat exchange means also changes in order to maintain a desired constant reaction temperature. Accordingly, unless suitable control means, such as the indicated liquid level controller and motor valve, are provided, it may happen that insufficient coolant will be present in the phase separator to satisfy the desired coolant circulation rate. Or if too much coolant is supplied to the phase separator through line 39, the desired vapor-liquid separation may be prevented.

The non-condensible gas, which is withdrawn from the upper portion of surge tank 37 through line 41, is then introduced into compressor 42. In compressor 42, the gas is compressed to the pressure at which the coolant is introduced into coils and jacket of the heat exchange means. After being compressed to this desired pressure, the gas is passed by means of line 43 to line 27 which is connected to coolant inlet line 22. Liquid coolant is withdrawn from phase separator 28 through line 46 and is then pumped into the heat exchange means through inlet line 22. The minimum amount the gas is compressed, in general, corresponds to the pressure drop through the coil and jacket of the heat exchange means. Liquid coolant recovered from phase separator 28 is withdrawn at a rate dependent upon the pumping rate of pump 47. It is noted that the pressure on the discharge side of the pump is greater than that at its inlet by an amount corresponding approximately to the pressure drop through the coil and jacket of the heat exchange means. A rate of flow controller, operatively connected to an orifice in line 22 and pump 47, can be provided for controlling the rate at which coolant is supplied to the heat exchange means and subsequently circulated through the coils and jacket. Similarly, a rate of flow controller, operatively connected to an orifice in line 43 and to compressor 42, can be used to control the rate at which the non-condensible gas is added to the liquid coolant. Lines 48 and 49 provide means for introducing make-up coolant and non-condensible gas, respectively, to the cooling system.

A more complete understanding of the invention can be obtained by referring to the following illustrative example which is not intended, however, to be unduly limitative of the invention.

*Example*

Ethylene is polymerized utilizing a reactor system similar to that illustrated in the drawing. The polymerization is carried out in the presence of a 60 mesh catalyst prepared by impregnating a 90 weight percent silica-10 weight percent alumina coprecipitated composite with an aqueous solution of chromium trioxide, drying, and heating for several hours in a stream of anhydrous air at about 950° F. The polymerization is conducted by contacting ethylene with the catalyst in the form of a slurry in cyclohexane. Cyclohexane is also employed as the coolant in the cooling system.

A slurry containing 10 weight percent of the above-described catalyst in cyclohexane is charged to the reactor at the rate of 113 pounds per hour. An ethylene feed stream containing about 95 percent ethylene is injected into the reactor at the rate of 1420 pounds per hour. The solvent cyclohexane is introduced into the reactor at the rate of 5500 pounds per hour. The pressure within the reactor is 450 p.s.i. while the reaction temperature is maintained at 285° F. by circulating the coolant in indirect heat exchange with the reaction mixture. The residence time of the reactant materials in the reactor is approximately 2 hours. The reactor effluent recovered from the reactor is passed to suitable means for separating polymer, cyclohexane, catalyst, and unreacted ethylene. In this separation, 808 pounds of polymer per hour is recovered.

The coolant cyclohexane, which enters the cooling coil and jacket at a temperature of 230° F. and a pressure of 49 p.s.i.a., is circulated through the reactor at the rate of 60,400 pounds per hour. Ethylene, which is employed as the non-condensible gas, is withdrawn from the surge tank and added to the cyclohexane prior to its introduction into the heat exchange means at the rate of 183 pounds per hour. An additional amount of ethylene is present in the cyclohexane so that ethylene is circulated through the coil and jacket of the heat exchange means at the rate of 201 pounds per hour. The amount of ethylene present (approximately one mol percent) is that required to give a bubble point at heat exchange inlet conditions, i.e., 230° F. and 49 p.s.i.a. In passing through the heat exchange means, 15 percent of the cyclohexane and 91 percent of the dissolved ethylene is vaporized. The coolant material upon removal from the heat exchange means is at a temperature of about 232° F. and a pressure of about 33 p.s.i.a. This material is then passed to the phase separator from which the cyclohexane vapors and non-condensible gas are taken overhead. These latter materials are then introduced into a condenser wherein the cyclohexane vapors are condensed before being passed into the coolant surge tank. From the coolant surge tank, the liquid cyclohexane, at a temperature of 222° F. and a pressure of 33 p.s.i.a., is pumped to the phase separator. Ethylene recovered from the upper portion of the surge tank is charged to a compressor wherein it is compressed to 49 p.s.i.a. prior to being mixed with the cyclohexane recovered from the phase separator. Thereafter, these materials are passed into and circulated through the coil and jacket of the heat exchange means as described hereinbefore.

From the foregoing, it is seen that a novel method has been provided for removing heat of reaction from a polymerization zone. By introducing a more volatile fluid into the liquid coolant as described hereinbefore, it is possible to cause vaporization to occur as soon as the coolant material is introduced into the heat exchange means and thereby improve the heat transfer characteristics of the heat exchanger. It will be apparent to those skilled in the art that variations and modifications of the invention can be made from a study of the foregoing disclosure. Such variations and modifications are believed to be clearly within the spirit and scope of the invention.

I claim:

1. In a process which comprises charging to a reaction zone as reactant materials a slurry of polymerization catalyst in a hydrocarbon solvent, liquid and inert under conditions of the process, and a polymerizable hydrocarbon, and circulating a vaporizable liquid as a coolant through a cooling zone in indirect heat exchange relation with the reaction materials in said reaction zone, said coolant partially vaporizing and thereby removing heat from said reaction zone, the improvement which comprises adding to said coolant a fluid which is gaseous under the conditions of temperature and pressure in said cooling zone prior to circulating said coolant through said cooling zone, vaporizing a portion of said coolant and added fluid substantially immediately upon introduction into said cooling zone, and recovering liquid and vaporous coolant and said gaseous added fluid.

2. The process of claim 1 in which the same material is used as the coolant as is used as the hydrocarbon solvent.

3. The process of claim 1 in which said added fluid is a light hydrocarbon containing from 1 to 6, inclusive, carbon atoms per molecule.

4. In a process which comprises contacting in a reaction zone a polymerizable hydrocarbon with a polymerization catalyst in the presence of a hydrocarbon solvent, liquid and inert under conditions of the process, circulating a coolant through a heat exchange zone in indirect heat exchange relation with reaction mixture in said reaction zone, the pressure of said coolant at its inlet into said heat exchange zone being higher than at its outlet from said zone and the temperature of said coolant at said outlet being substantially equal to the boiling point of said coolant at said outlet pressure, and vaporizing coolant within said heat exchange zone, the improvement which comprises adding a non-condensible gas to said coolant prior to introduction thereof into said heat exchange zone so as to lower the boiling point of said coolant at its inlet pressure into said heat exchange zone; and withdrawing from said heat exchange zone a stream comprising liquid and vaporous coolant and non-condensible gas.

5. The process of claim 4 in which the amount of non-condensible gas added to said coolant is sufficient to cause said coolant to boil at said inlet pressure to said heat exchange zone.

6. The process of claim 4 in which said coolant is a vaporizable liquid hydrocarbon and said non-condensible gas is a light hydrocarbon containing from 1 to 6, inclusive, carbon atoms per molecule.

7. The process of claim 6 in which the amount of light hydrocarbon added is the maximum amount thereof which is soluble in said liquid hydrocarbon coolant at the heat exchange zone inlet pressure and temperature of said coolant.

8. The process of claim 4 in which said stream withdrawn from said heat exchange zone is passed into a first separation zone; a stream comprising vaporous coolant and non-condensible gas is recovered from said first separation zone; said latter stream is cooled so as to condense said vaporous coolant; said condensed coolant and non-condensible gas are passed into a second separation zone; said condensed coolant is passed from said second separation zone into said first separation zone; liquid coolant is passed from said first separation zone into said heat exchange zone; and non-condensible gas is withdrawn from said second separation zone and added to said liquid coolant prior to introduction thereof into said heat exchange zone.

9. The process of claim 8 in which said condensed coolant is passed from said second separation zone into said first separation zone at a rate sufficient to maintain a predetermined liquid level within said first separation zone.

10. In a process wherein ethylene is polymerized in a reaction zone in admixture with at least one hydrocarbon selected from the group consisting of normally liquid paraffins and naphthenes in the presence of a catalyst comprising a minor amount of chromium in the form of chromium oxide, and containing a substantial amount of hexavalent chromium, associated with at least one oxide selected from the group consisting of silica, alumina, zirconia, and thoria, at a temperature in the range of about 150 to 450° F. and a pressure sufficient to maintain the reaction mixture in the liquid phase and a coolant is circulated through a cooling zone at a constant rate in indirect heat exchange with reaction mixture in said reaction zone, the improvement which comprises adding ethylene to said coolant prior to circulating same in indirect heat exchange with said reaction mixture; and vaporizing said coolant and ethylene substantially immediately upon introduction into said cooling zone, thereby removing heat therefrom.

11. In a polymerization reactor system comprising a closed reaction vessel, conduit means for introducing catalyst into said reaction vessel, conduit means for introducing solvent into said reaction vessel, conduit means for introducing feed material into said reaction vessel, indirect heat exchange means associated with said reaction vessel, coolant inlet means attached to said indirect heat exchange means, and coolant outlet means attached to said indirect heat exchange means, the improvement comprising, in combination, means for introducing a fluid into said coolant inlet means; a phase separator; first conduit means connecting said coolant outlet means to said phase separator; a condenser; fluid conduit means connecting said phase separator to said condenser; a coolant surge tank; second conduit means connecting said condenser to said surge tank; third conduit means connecting the lower portion of said surge tank to said phase separator; a compressor; fourth conduit means connecting the upper portion of said surge tank to said compressor, fifth conduit means connecting said compressor to said means for introducing a fluid into said coolant inlet means; and sixth conduit means connecting the lower portion of said phase separator to said coolant inlet means.

12. The improvement according to claim 11 in which a liquid level controller is operatively connected to said phase separator and to a flow control means in said third conduit means.

13. In a process in which materials reacted in a reaction zone liberate heat of reaction and a vaporizable liquid is circulated as a coolant through a cooling zone in indirect heat exchange relation with the reaction materials in said reaction zone, said coolant partially vaporizes and thereby removes heat from said reaction zone, the improvement which comprises adding to said coolant a fluid which is gaseous under the conditions of temperature and pressure in said cooling zone prior to circulating said coolant through said cooling zone.

References Cited in the file of this patent
UNITED STATES PATENTS

| | | |
|---|---|---|
| 1,691,903 | Mortimer | Nov. 13, 1928 |
| 2,409,376 | Mekler | Oct. 15, 1946 |
| 2,431,630 | Arveson | Nov. 25, 1947 |
| 2,519,481 | Kubie et al. | Aug. 22, 1950 |
| 2,547,970 | Phillips et al. | Apr. 10, 1951 |
| 2,664,346 | Mayhew | Dec. 29, 1953 |
| 2,697,334 | Clarke | Dec. 21, 1954 |
| 2,755,782 | Campbell et al. | July 24, 1956 |
| 2,788,264 | Bremer et al. | Apr. 9, 1957 |
| 2,881,235 | Pool | Apr. 7, 1959 |
| 2,886,561 | Reynolds et al. | May 12, 1959 |
| 2,908,734 | Cottle | Oct. 13, 1959 |